United States Patent [19]

Boschetti et al.

[11] 3,764,693

[45] Oct. 9, 1973

[54] RODENTICIDAL COMPOSITIONS CONTAINING 4-HYDROXY COUMARINS

[75] Inventors: Eugene Boschetti, Venissieux; Darius Molho, Boulogne-sur-Seine; Louis Fontaine, Lyon, all of France

[73] Assignee: Lipha, Lyonnaise Industrielle Pharmaceutique, Lyon, France

[22] Filed: Mar. 10, 1971

[21] Appl. No.: 123,094

Related U.S. Application Data

[62] Division of Ser. No. 878,876, Nov. 21, 1969, Pat. No. 3,651,091.

[52] U.S. Cl..... 424/281, 260/340.5 X, 260/343.2 X
[51] Int. Cl................................................ A01n 9/28
[58] Field of Search................. 424/281; 260/343.2, 260/340.5 X

[56] References Cited
UNITED STATES PATENTS

| | | | |
|---|---|---|---|
| 2,427,578 | 9/1947 | Stahmann et al. | 260/343.2 |
| 3,032,557 | 5/1962 | Molho | 260/343.2 |
| 3,135,797 | 6/1964 | Biel | 260/340.5 X |
| 3,651,091 | 3/1972 | Boschetti et al. | 424/282 |

*Primary Examiner*—Albert T. Meyers
*Assistant Examiner*—D. Robinson
*Attorney*—Browdy & Neimark

[57] ABSTRACT

The 4-hydroxy coumarins are represented by the formula

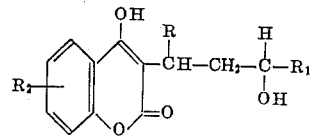

in which R is a member of the group formed by hydrogen, the phenyl, halophenyl, dihalophenyl, nitrophenyl, methoxyphenyl, tolyl, methylene dioxyphenyl and furyl radicals;

$R_1$ is a member of the group formed by the methyl, phenyl, halophenyl, nitrophenyl, diphenyl, halodiphenyl, nitrodiphenyl and naphthyl radicals; and $R_2$ is hydrogen or a halogen.

These new 4-hydroxy coumarins have very powerful oral anticoagulating actions of the antivitamin K type and are useful as rodenticides.

10 Claims, No Drawings

A RODENTICIDAL COMPOSITIONS CONTAINING 4-HYDROXY COUMARINS

This application is a divisional of application Ser. No. 878,876 filed Nov. 21, 1969, which is now U.S. Pat. No. 3,651,091.

Our copending application Ser. No. 689,347, filed Dec. 11, 1967 now U.S. Pat. No. 3,574,234, relates to 4-hydroxy coumarin derivatives, which are represented by the general formula

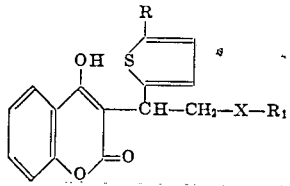

in which

X is a member of the group formed by the carbonyl and carbinol radicals;

R is a member of the group formed by hydrogen, the halogens, the methyl and nitro radicals;

and $R_1$ is a member of the group formed by the methyl radicals - except when X is CO and R is hydrogen - and phenyl which is optionally substituted by the halogens, the hydroxy, methyl, methoxy and nitro radicals.

The present improvement is concerned with new (4'-hydroxy-3'-coumarinyl) compounds, which are substituted by an aliphatic side chain, in which X, in the 1-position, is a substituted carbinol radical

as in the copending application, and optionally substituted in the 3-position by an aromatic or heterocyclic radical.

The new 4-hydroxy coumarins of the present improvement are represented by the formula

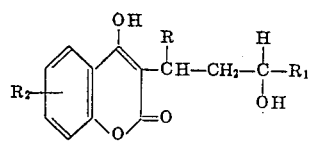

in which R is a member of the group formed by hydrogen, the phenyl, halophenyl, dihalophenyl, nitrophenyl, methoxyphenyl, tolyl, methylene dioxyphenyl and furyl radicals;

$R_1$ is a member of the group formed by the methyl, phenyl, halophenyl, nitrophenyl, diphenyl, halodiphenyl, nitrodiphenyl and naphthyl radicals;

$R_2$ is hydrogen or a halogen.

In the preferred subgenus, R is H or $C_6H_5$; $R_1$ is $C_6H_4$, $C_6H_5$ or $C_6H_4-C_6H_4X$ wherein X is Br or Cl; and $R_2$ is H.

These new 4-hydroxy coumarins have very powerful oral anticoagulating actions of the antivitamin K type.

The hypoprothrombinemiant properties of the compounds of the invention make them of particular interest.

Furthermore, the 4-hydroxy coumarins of the present improvement are raticides of considerable interest, which cause in rodents, which have consumed food to which these new compounds are added, a high mortality due to internal hemmorhage.

The 4-hydroxy coumarins of formula (II) can be obtained by reduction of compounds of formula

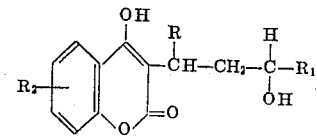

in which the substituents R, $R_1$ and $R_2$ have the same meanings as in formula (II).

The reduction of the intermediate ketone compounds is effected either by means of aluminium isopropylate or isopropanolic solution, or by a hydride of alkali metal and boron.

It has recently been found, as previously mentioned in the parent patent, that the reduction of the carbonyl group of the intermediate molecules into carbinol grouping increases, depending on the value of R and $R_1$ in the general formula (II), and to a very considerable degree, the hypoprothrombinemiant activity of these compounds.

Certain intermediate ketone compounds which come within the scope of the general formula (III), in which R, $R_1$ and $R_2$ have the same meanings as previously, are novel and because of this fact form part of the invention; these are more particularly the following 4-hydroxy coumarins:

(parabromophenyl-2'-parabenzoyl)-3-ethyl-4-hydroxy coumarin, (parachlorophenyl-2'-parabenzoyl)-3-ethyl-4-hydroxy coumarin, (paranitrophenyl-2-'-parabenzoyl)-3-ethyl-4-hydroxy coumarin, (2'-parabromobenzoyl)-3-ethyl-6-bromo-4-hydroxy coumarin, (2'-parachlorobenzoyl)-3-ethyl-6-chloro-4-hydroxy coumarin, (2'-benzoyl)-3-ethyl-6-bromo-4-hydroxy coumarin, 3-(4'-hydroxy-3'-coumarinyl)-3-phenyl parachloropropiophenone, 3-(4'-hydroxy-3'-coumarinyl)-3-paranitrophenylpropiophenone, 3-(4'-hydroxy-3'-coumarinyl)-3-parabromophenylpropiophenone, 3-(4'-hydroxy-3'-coumarinyl)-3β-phenyl-1-naphthyl-propan-1-one, 3-(4'-hydroxy-3'-coumarinyl)-3-phenyl-(1-(4'-diphenylyl))-propan-1-one, 3-(4'-hydroxy-3'-coumarinyl)-3-phenyl-1-(4-chloro-4'-diphenylyl)-propan-1-one, 3-(4'-hydroxy-3'-coumarinyl)-3-phenyl-1-(4-bromo-4'-diphenylyl)-propan-1-one.

The new compounds according to the application are easily obtained according to one or other of the following two methods.

When R represents hydrogen in the new ketones of formula III, these are easily obtained by condensation of 4-hydroxy coumarin with a mineral acid salt of substituted 3-piperidino propan-1-one, preferably the piperidino propanone hydrochloride of formula

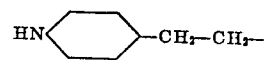

CO-R₁.HCl, in which R₁ has the same meaning as in the formula previously referred to.

When the new ketones contain an asymmetrical carbon, that is to say, when R in formula III represents a phenyl, halophenyl, nitrophenyl or furyl radical, these are obtained by 4-hydroxy coumarin being condensed with an α-ethylenic ketone of the general formula R-CH=CH-CO-R₁, in which R₁ has the same meaning as in formula III.

Examples which illustrate the invention in a non-limiting manner are given below:

EXAMPLE 1: 3-(4'-hydroxy-3'-coumarinyl)-1-phenyl-propan-1-ol

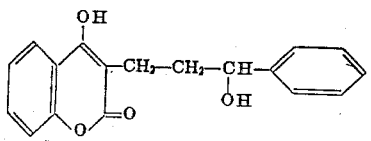

7.35 g (0.025 mol) of 3-ethyl-(2-benzoyl)-4-hydroxy coumarin, Mp = 152°C, prepared by the method described in French Pat. No. 1,206,393 of the 18th Aug. 1958, are placed in suspension in 150 ml of anhydrous methanol. 2.85 g (0.075 mol) of sodium hydrobromide are added in small fractions, while keeping the temperature below 20°C. On completing the addition, the mixture is left while stirring for 3 hours at ambient temperature, whereafter it is acidified with 3 ml of acetic acid. The solution is evaporated to dryness and the residue is taken up in 200 ml of a hot 5% solution of HNaCO₃. This solution is acidified and the compound which is obtained is recrystallised twice from 50% aqueous ethanol. There are obtained 4.3 g (58.5 %) of a white product melting at 114°C (sealed tube - Gallenkamp apparatus).

Gravimetric analysis: C₁₈H₁₆O₄ - Molecular weight = 293.31

|  | C % | H % |
|---|---|---|
| calculated | 72.96 | 5.44 |
| found | 73.11 | 5.62 |

EXAMPLE 2: 3-(4'-hydroxy-3'-coumarinyl)-1-parachlorophenyl-propan-1-ol

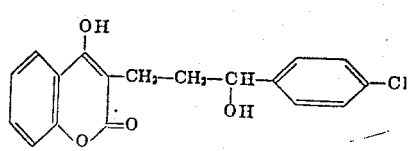

3.3 g (0.01 mol) of 3-ethyl-(2-parachlorobenzoyl)-4-hydroxy coumarin, Mp = 216°C, prepared as in Example 1, are reduced under the same conditions with 1.1 g (0.03 mol) of sodium hydrobromide. There are obtained 2.4 g of a white product crystallising in the form of flakes in 50% aqueous ethanol and melting at 159°-160°C (sealed tube).

Gravimetric analysis: C₁₈H₁₅ClO₄, molecular weight = 330.5

|  | C % | H % |
|---|---|---|
| calculated | 65.36 | 4.57 |
| found | 65.56 | 4.60 |

EXAMPLE 3: 3-(4'-hydroxy-3'-coumarinyl)-1-parabromophenyl-propan-1-ol

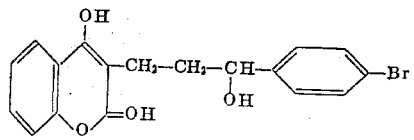

3.7 g (0.01 mol) of 3-ethyl-2-)parabromobenzoyl)-4-hydroxy coumarin (Mp = 230°C) are reduced in anhydrous methanol with 1.1 g (0.03 mol) of sodium hydrobromide. After the same operations as in Example 1, the product obtained is solubilised in a 5% HNaCO₃ solution; the solution is acidified and the precipitate is recrystallised from 50% aqueous ethanol. There are obtained 2.8 g of product, melting at 159°C (sealed tube).

Gravimetric analysis: C₁₈H₁₅O₄Br, molecular weight - 375.12

|  | C% | H% |
|---|---|---|
| calculated | 57.61 | 4.03 |
| found | 57.41 | 4.15 |

EXAMPLE 4: 3-(4'-hydroxy-3'-coumarinyl)-1-paranitrophenyl-propan-1-ol

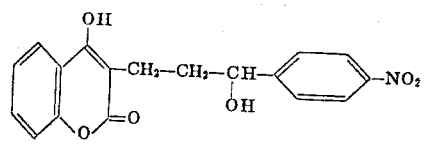

3.4 g (0.01 mole) of 3-ethyl(2-paranitrobenzoyl)-4-hydroxy coumarin are reduced with 6.12 g (0.03 mol) of aluminium isopropylate in 75 ml of anhydrous isopropanol. After refluxing for 1 hour, the mixture is poured into iced water and acidified with 10 ml of concentrated HCl. It is suction-filtered, washed with water and recrystallised from 50% ethanol. After filtration, it is allowed to crystallise. The product is solubilised in a 5% solution of HNaCO₃ and then, after acidification, it is once again crystallised from 50% aqueous ethanol. Yield = 2.3 g, i.e. 68%. The product has a melting point of 178°C (sealed tube).

Gravimetric analysis: C₁₅H₁₅NO₆, molecular weight = 341.30

|  | C % | H % |
|---|---|---|
| calculated | 63.34 | 4.43 |
| found | 63.47 | 4.38 |

EXAMPLE 5: 3-(4'-hydroxy-3'-coumarinyl)-1-paradiphenylyl-propan-1-ol

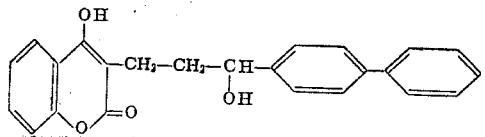

7.4 g (0.02 mole) of 3-ethyl-(paraphenyl-2-benzoyl)-4-hydroxy coumarin (Mp - 230°C), obtained in accordance with the procedures specified in Example 1, are reduced with 2.3 g (0.06 mol) of sodium hydrobromide in 150 ml of ethanol. After recrystallisation from dilute alcohol, there are obtained 6.3 g of white crystals melting at 160°C (sealed tube).

Gravimetric analysis: C₂₄H₂₀O₄, molecular weight - 372.40

|  | C % | H % |
|---|---|---|
| calculated | 77.41 | 5.41 |
| found | 77.60 | 5.31 |

EXAMPLE 6: 3-(4'-hydroxy-3'-coumarinyl)-1-(4'-bromopara-diphenylyl)-propan-1-ol

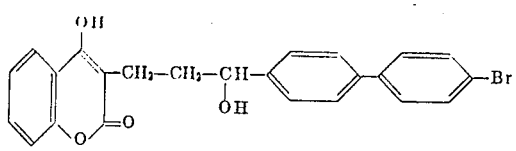

This product is prepared from the 3-ethyl-(parabromophenyl-2-benzoyl)-4-hydroxy coumarin, which is a new compound obtained in the following manner: 6.15 g (0.015 mol) of 3-piperidino-parabromophenyl propiophenone hydro-chloride (TOHUKU YAKKA DIAGAKU KIYO, 4, 68–78, 1957) are refluxed for 3 hours with 2.43 g (0.015 mol) of 4-hydroxy coumarin in 50 ml of pyridine. The solution is poured into iced water and acidified with HCl. The product is washed with boiling acetic acid and then with alcohol. It melts at 221°C (sealed tube).

Yield = 4.5 g
Gravimetric analysis: $C_{24}H_{17}BrO_4$, molecular weight = 449.30

|  | C % | H % | Br % |
|---|---|---|---|
| calculated | 64.16 | 3.80 | 17.79 |
| found | 63.96 | 3.88 | 17.61 |

This compound is reduced in the following manner: 4.49 g (0.01 mol) are suspended in 75 ml of isopropanol. 6.12 g (0.03 mol) of aluminum isopropylate are introduced and refluxing takes place for 1 hour. The compound is poured into iced water and acidified to pH 1 with HCl. The product which precipitates is suction-filtered and recrystallised twice from 50% aqueous alcohol. Yield = 67% of 3-(4'-hydroxy-3'-coumarinyl)-1-(4'-bromo para-diphenylyl)-propanol, melting at 202°C (sealed tube).
Gravimetric analysis: $C_{24}H_{19}BrO_4$, molecular weight = 451.31

|  | C% | H% | Br % |
|---|---|---|---|
| calculated | 63.87 | 4.24 | 17.71 |
| found | 63.83 | 4.40 | 17.88 |

EXAMPLE 7: 3'-(4'-hydroxy-3'-coumarinyl)-1-(4'-chloro-paradiphenylyl)-propan-1-ol

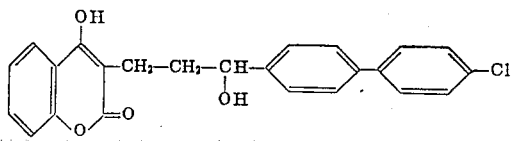

This compound was prepared from the 3-ethyl-(parachlorophenyl-2-benzoyl)-4-hydroxy coumarin, a new compound which itself was prepared in the following manner:

4,86 g (0.03 mol) of 4-hydroxy coumarin,
10.92 g (0.03 mol) of 3-piperidino-parachlorophenyl propiophenone hydrochloride (TOHUKU YAKKA DAIGAKU DIYO, 4, 69–78, 1957) and 60 ml of pyridine are refluxed for 3 hours. The reddish limpid solution is poured into iced water and acidified with HCl. The product obtained is suction-filtered and recrystallised from $CH_3COOH$. There are obtained 9.8 g (81%) of a product melting at 212°C (sealed tube).
Gravimetric analysis: $C_{24}H_{17}ClO_4$ - molecular weight = 404.83

|  | C % | H % |
|---|---|---|
| calculated | 71.21 | 4.23 |
| found | 71.04 | 4.37 |

This compound, reduced as in Example 5 with aluminium isopropylate, melts at 165°C (sealed tube) and is only slightly soluble in aqueous alkali medium.
Gravimetric analysis: $C_{24}H_{19}ClO_4$ - molecular weight = 406.84

|  | C% | H% |
|---|---|---|
| calculated | 70.86 | 4.71 |
| found | 70.72 | 4.89 |

EXAMPLE 8: 3-(4'-hydroxy-3'-coumarinyl)-1-(4'-nitropara-diphenylyl)-propan-1-ol

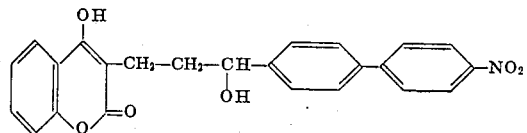

This compound is prepared from the 3-ethyl-(paranitrophenyl-2-benzoyl)-4-hydroxy coumarin, which is a new product prepared in the following manner: 4.86 g (0.03 mol) of 4-hydroxy coumarin, 11.24 g (0.03 mol) of 3-piperidino-paranitrophenyl propiophenone hydrochloride and 60 ml of pyridine are refluxed for three hours. The solution, poured into cold water, is acidified and the product which precipitates is suction-filtered and crystallised in acetic acid. It melts at 237°C (sealed tube). Yield = 10.20 g, i.e. 82%
Gravimetric analysis: $C_{24}H_{17}NO_6$ - molecular weight = 415.38

|  | C% | H% |
|---|---|---|
| calculated | 69.40 | 4.13 |
| found | 69.38 | 4.21 |

This compound is reduced as in the preceding example with aluminium isopropylate and recrystallised from 60% aqueous ethanol. It melts at 190°C (sealed tube). Yield = 59%.
Gravimetric analysis: $C_{24}H_{19}NO_6$ - molecular weight = 417.39

|  | C% | H% |
|---|---|---|
| calculated | 69.07 | 4.58 |
| found | 68.95 | 4.63 |

EXAMPLE 9: 3-(6'-bromo-4'-hydroxy 3'-coumarinyl)-1-para-bromophenyl-propan-1-ol

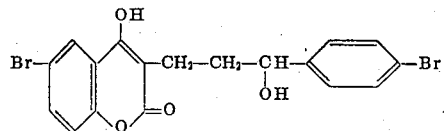

This compound was obtained by reducing the 3-ethyl-(parabromo-2-benzoyl)-6-bromo-4-hydroxy coumarin.

This new intermediary was prepared as in the preceding examples by condensing the 6-bromo-4-hydroxy coumarin with 3-piperidino parabromopropiophenone hydrochloride in pyridine. It is a white compound, of which the alkaline salts are sparingly soluble in water and melt at 236°C.

The reduction was carried out under the following conditions: 6.78 g (0.015 mol) of the above compound are reduced with 9.18 g (0.045 mol) of aluminium isopropylate in 150 ml of anhydrous isopropanol. After recrystallisation from 60% aqueous ethanol, there are obtained 5.5 g (81%) of a compound crystallising as white needles, melting at 168°C.
Gravimetric analysis: $C_{18}H_{14}Br_2O_4$ - molecular weight = 454.13

|  | C% | H% |
|---|---|---|
| calculated | 47.60 | 3.11 |
| found | 47.76 | 3.17 |

EXAMPLE 10: 3-(6'-chloro-4'-hydroxy-3'-coumarinyl)-1-para-chlorophenyl-propan-1-ol

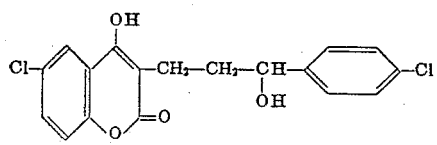

This compound was obtained from the 3-ethyl-(2-para-chlorobenzoyl)-6-chloro-4-hydroxy coumarin, a new compound melting at 226°C and prepared by the action of 3-piperidino-parachloropropiophenone hydrochloride on 6-chloro-4-hydroxy coumarin in pyridine. 7.26 g (0.02 mol) of this compound were reduced with 2.27 g (0.06 mol) of sodium hydrobromide in 150 ml of anhydrous methanol. Using the technique previously described, there are obtained 5.7 g (78%) of a white compound which is well-crystallised (aqueous ethanol) and melts at 179°C (sealed tube).
Gravimetric analysis: $C_{18}H_{14}Cl_2O_4$ - molecular weight = 365.20

|  | C% | H% |
|---|---|---|
| calculated | -bromo-59.19 | 3.85 |
| found | 59.31 | 4.04 |

EXAMPLE 11: 3-(6'-bromo-4'-hydroxy-3'-coumarinyl)-1-phenyl-propan-1-ol

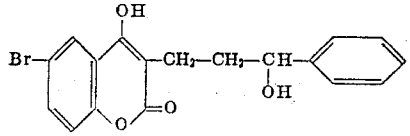

7.46 g (0.02 mol) of 3-ethyl-(2'-benzoyl)-6-bromo-4-hydroxy coumarin (Mp = 180°C) are reduced with 12.24 g (0.06 mol) of aluminium isopropylate in 150 ml of anhydrous isopropanol. After refluxing for 1 hour, the solution is poured into iced water and acidified with concentrated HCl. The white precipitate is suction-filtered after standing for 12 hours. It is recrystallised from 50% aqueous ethanol. Yield = 6.1 g, i.e. 81%. Melting point in a sealed tube: 187°C.
Gravimetric analysis: $C_{18}H_{15}BrO_4$ - molecular weight = 375.22

|  | C% | H% |
|---|---|---|
| calculated | 57.59 | 4.03 |
| found | 57.51 | 4.15 |

EXAMPLE 12: 4-(4'-hydroxy-3'-coumarinyl)-4-phenyl-butan-2-ol

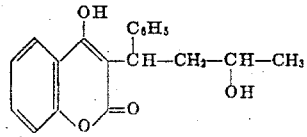

4.62 g (0.015 mol) of 4-(4'-hydroxy-3'-coumarinyl)-4-phenyl-butan-2-one (J. Am. Chem. Soc., 66 902–6, 1944) are refluxed for 1 hour with 9.18 g (0.045 mol) of aluminium isopropylate in 120 ml of anhydrous isopropanol. The mixture is poured into 600 ml of iced water containing 20 ml of 6N-HCl. The oil which decants is taken up in a 10% $HNaCO_3$ solution, filtered and the alkaline solution is acidified. The product precipitates in the form of a white powder.

A second treatment is carried out with bicarbonate in the cold. The product is suction-filtered and dried under vacuum at ambient temperature. It shows a pasty fusion at 94°–96°C (sealed tube). Yield = 3.25 g.
Gravimetric analysis: $C_{19}H_{18}O_4$ - molecular weight = 310.33

|  | C% | H% |
|---|---|---|
| calculated | 73.53 | 5.85 |
| found | 73.37 | 5.80 |

EXAMPLE 13: 4-(4'-hydroxy-3'-coumarinyl)-4-parachlorophenyl-butan-2-ol

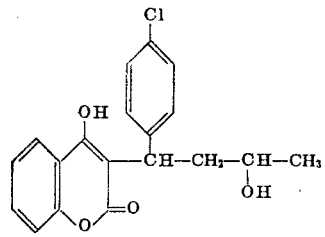

As in Example 12, 10.27 g (0.03 mol) of 4-(4'-hydroxy-3'-coumarinyl)-4-parachlorophenyl-butan-2-one (W.G. Stoll, Proc. Interm. Conf. Thromb. Embol. 1954, 244–50), are reduced with 18.36 g (0.09 mol) of aluminium isopropylate.

The product which is obtained (6.35 g - yield 61.5%) shows a pasty fusion at 95°–97°C (sealed tube).
Gravimetric analysis: $C_{19}H_{17}ClO_4$ - molecular weight = 344.78

|  | C% | H% |
|---|---|---|
| calculated | 66.18 | 4.97 |
| found | 66.03 | 5.04 |

EXAMPLE 14: 4-(4'-hydroxy-3'-coumarinyl)-4-paramethoxy phenyl-butan-2-ol

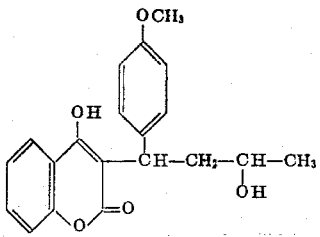

6.76 g (0.02 mol) of 4-(4'-hydroxy-3'-coumarinyl)-4-paramethoxy phenoxy phenyl-butan-2-one (J. Am. Chem. Soc., 66, 902–6, 1944) are treated with 12.24 g (0.06 mol) of aluminium isopropylate in 120 cc of isopropanol under the conditions previously described.

There are obtained 6.2 g (91%) of a white compound which is soluble in the cold in a 5% bicarbonate solution which, after recrystallisation from a mixture of acetone and water, melts at 78°C (sealed tube).
Gravimetric analysis: $C_{20}H_{20}O_5$ - molecular weight = 340.36

|  | C% | H% |
|---|---|---|
| calculated | 70.58 | 5.92 |
| found | 70.78 | 6.11 |

EXAMPLE 15: 4-(4'-hydroxy-3'-coumarinyl)-4-(3',4'-dichlorophenyl)-butan-2-ol

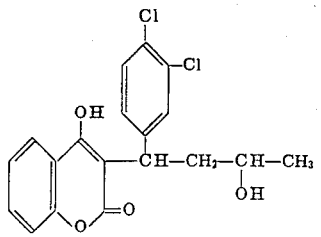

7.4 g (0.02 mol) of 4-(4'-hydroxy-3'-coumarinyl)-4-(3',4'-dichlorophenyl)-butan-2-one (Mp = 176°C) reduced with 0.03 mol of isopropylate, lead with a yield of 93% to a white compound which has good solubility in a 5% $HNaCO_3$ solution and melting at 92°C (sealed tube - pasty fusion).
Gravimetric analysis: $C_{19}H_{16}Cl_2O_4$ - molecular weight = 379.23

|  | C% | H% |
|---|---|---|
| calculated | 60.17 | 4.25 |
| found | 60.08 | 4.30 |

EXAMPLE 16: 4-(4'-hydroxy-3'-coumarinyl)-4-paratolyl-butan-2-ol

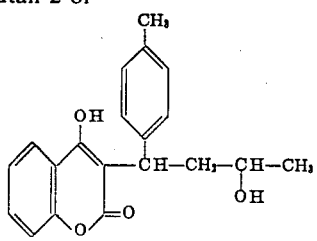

8.05 g (0.025 mol) of 4-(4'-hydroxy-3'-coumarinyl)-4-paratolyl-butan-2-one are reduced under the conditions of the preceding examples with 15.3 g (0.075 mol) of aluminium isopropylate in 150 ml of isopropanol. After passing through a bicarbonate solution, acidification and recrystallisation from acetone and water, there are obtained 5.70 g (70%) of a white compound melting at 119°C (sealed tube).
Gravimetric analysis: $C_{20}H_{20}O_4$ - molecular weight = 324.36

|  | C% | H% |
|---|---|---|
| calculated | 74.06 | 6.21 |
| found | 73.93 | 6.39 |

EXAMPLE 17: 4-(4'-hydroxy-3'-coumarinyl)-4-(3',4'-methylene dioxyphenyl)-butan-2-ol

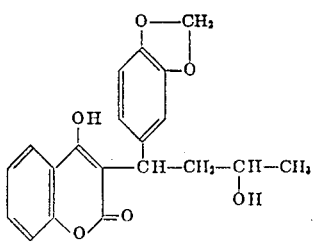

7.04 g (0.02 mol) of 4-(4'-hydroxy-3'-coumarinyl)-4-(3',4'-methylene dioxyphenyl)-butan-2-one are reduced with 12.24 g (0.06 mol) of aluminium isopropylate. The product obtained, with a yield of 87%, shows a pasty fusion at 96°C in a sealed tube.
Gravimetric analysis: $C_{20}H_{18}O_6$ - molecular weight = 354.34

|  | C% | H% |
|---|---|---|
| calculated | 67.79 | 5.12 |
| found | 67.64 | 5.23 |

EXAMPLE 18: 4-(4'-hydroxy-3'-coumarinyl)-4-(paranitrophenyl)-butan-2-ol

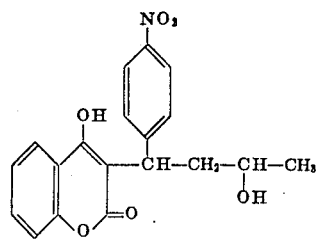

7.06 g (0.02 mol) of 4-(4'-hydroxy-3'-coumarinyl)-4-paranitrophenyl-butan-2-one are reduced with 12.24 g (0.03 mol) of aluminium isopropylate. There are obtained 6.6 g of a white compound melting at 106°C (acetone-water) in a sealed tube, corresponding to a yield of 93%.
Gravimetric analysis: $C_{19}H_{17}NO_6$ - molecular weight = 355.33

|  | C% | H% |
|---|---|---|
| calculated | 64.21 | 4.82 |
| found | 64.04 | 4.96 |

EXAMPLE 19: 4-(4'-hydroxy-3'-coumarinyl)-4-(metanitro-phenyl)-butan-2-ol

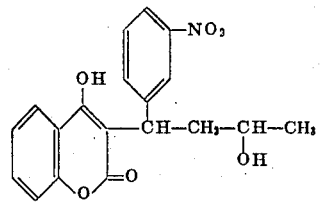

Starting with 7.06 g (0.02 mole) of 4-(4'-hydroxy-3'-coumarinyl)-4-(metanitrophenyl)-butan-2-one, reduced with 12.24 g (0.03 mol) of aluminium isopropylate, there is obtained, with a yield of 91.50%, 6.4 g of 4-(4'-hydroxy-3'-coumarinyl)4-(metanitrophenyl)-butanol, melting at 96°C (sealed tube).
Gravimetric analysis: $C_{19}H_{17}NO_6$ - molecular weight = 355.33

|  | C% | H% |
|---|---|---|
| calculated | 64.21 | 4.82 |
| found | 64.08 | 4.90 |

EXAMPLE 20: 4-(4'-hydroxy-3'-coumarinyl)-α-4-furyl-butan-2-ol

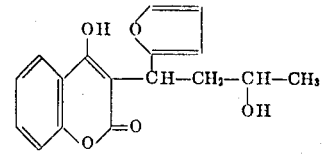

Starting with 8.94 g (0.03 mol) of 4-(4'-hydroxy-3'-coumarinyl)-α-4-furyl-butan-2-one, reduced with 18.36 g (0.09 mol) of aluminium isopropylate in 150 ml of isopropanol, there is obtained a precipitate which, after being solubilised in HNaCO₃, acidified and recrystallised from hexane in the presence of a small quantity of acetone, melts at 77°C in a sealed tube. Yield = 6 g, i.e. 66%.

Gravimetric analysis: $C_{17}H_{16}O_5$ - molecular weight = 300.30

|  | C% | H% |
|---|---|---|
| calculated | 67.99 | 5.37 |
| found | 68.12 | 5.52 |

EXAMPLE 21: 3-(4'-hydroxy-3'-coumarinyl)-1,3-diphenyl-propan-1-ol

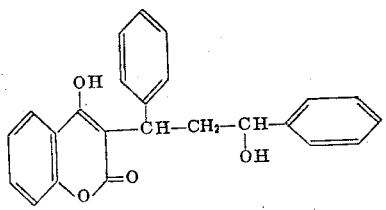

18.5 g (0.05 mol) of 3-(4'-hydroxy-3'-coumarinyl)-3-phenyl propiophenone and 30.6 g (0.15 mol) of aluminium isopropylate are heated under reflux for 1 hour. The solution is poured into acidulated iced water and the product which precipitates is taken up in a hot 10% sodium bicarbonate solution. The alkaline solution is acidified. The product which precipitates, dried under vacuum, melts at 85°C (sealed tube).

As set out in the parent patent, these molecules have two asymmetrical carbon atoms and it can be assumed that the compounds obtained are a mixture of diastereo isomers. With certain compounds, when the end of the chain is aromatic, it has been possible by crystallisation to obtain one of the diastereo isomers having a melting point decidedly higher than the mixture. Analysis of the mixture, which melts at 85°C and is obtained with a yield of 70%, is as follows:

Gravimetric analysis: $C_{24}H_{20}O_4$ - molecular weight = 372.40

|  | C% | H% |
|---|---|---|
| calculated | 77.40 | 5.41 |
| found | 77.53 | 5.46 |

After recrystallisation from a mixture of acetone and hexane or a mixture of methyl isobutyl ketone and hexane, a compound is obtained which melts at 132°C (sealed tube), of which the gravimetric analysis is as follows:

$C_{24}H_{20}O_4$

|  | C% | H% |
|---|---|---|
| calculated | 77.40 | 5.41 |
| found | 77.20 | 5.42 |

EXAMPLE 22: 3-(4'-hydroxy-3'-coumarinyl)-3-parachlorophenyl-1-phenyl-propan-1-ol

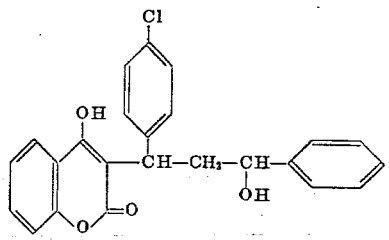

16.2 g (0.04 mol) of 3-(4'-hydroxy-3'-coumarinyl)-3-parachlorophenyl-propiophenone are reduced with 24.5 g (0.12 mol) of aluminium isopropylate in 300 ml of anhydrous isopropanol. After refluxing for 1 hour, the solution is poured into acidulated water and the product which precipitates is taken up in 600 ml of hot 5% HNaCO₃. The solution is filtered and acidified. There are obtained 12.2 g (75%) of a white compound which melts at 95°C (pasty fusion) (sealed tube).

Gravimetric analysis: $C_{24}H_{19}ClO_4$ - molecular weight = 406.84

|  | C% | H% |
|---|---|---|
| calculated | 70.85 | 4.71 |
| found | 70.66 | 4.83 |

After being recrystallised twice from a mixture of methyl isobutyl ketone and hexane, the diastereo isomer is obtained, which melts at 168°C (sealed tube).

Gravimetric analysis: $C_{24}H_{19}ClO_4$ - molecular weight = 406.84

|  | C% | H% |
|---|---|---|
| calculated | 70.85 | 4.71 |
| found | 70.83 | 4.69 |

EXAMPLE 23: 3-(4'-hydroxy-3'-coumarinyl)-1,3-di-(parachlorophenyl)-propan-1-ol

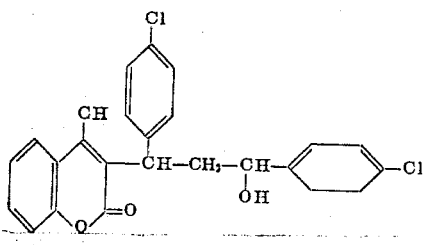

Under the foregoing conditions, 17.6 (0.04 mol) of 3-(4'-hydroxy-3'-coumarinyl)-3-parachlorophenyl-parachloropropiophenone, Mp = 162°C, are reduced with 24.5 g (0.12 mol) of aluminium isopropylate. The desired product is obtained with a yield of 72%, melting at 105°C after being passed twice through HNaCO₃.

Gravimetric analysis: $C_{24}H_{18}O_4Cl$ - molecular weight = 441.29

|  | C% | H% | Cl% |
|---|---|---|---|
| calculated | 65.32 | 4.11 | 16.07 |
| found | 65.12 | 4.30 | 15.87 |

EXAMPLE 24: 3-(4'-hydroxy-3'-coumarinyl)-3-phenyl-1-para-chlorophenyl-propan-1-ol

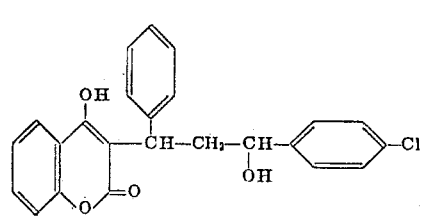

This compound is obtained from the 3-(4'-hydroxy-3'-coumarinyl)-3-phenyl-parachloropropiophenone, which is a new compound obtained in the following manner: 17.8 g (0.11 mol) of 4-hydroxy coumarin are condensed with 24.3 g (0.1 mol) of benzylidene parachloroacetophenone in the presence of 80 mg of hexamethyelene imine in 160 ml of water. The mixture is left under reflux for 5 hours, the organic phase is decanted and crystallised in benzene. The product, $C_{24}H_{17}ClO_4$, melts at 165°C (sealed tube).

The ketone compound is reduced under the usual conditions: 16.2 g (0.04 mol) and 24.5 g (0.12 mol) of aluminium isopropylate in 300 ml of isopropanol. After acidification of a solution in sodium bicarbonate, there are obtained 12.7 g (77%) of a white compound melting at 95°C (sealed tube)

Gravimetric analysis: $C_{24}H_{19}ClO_4$ - molecular weight = 406.84

|  | C% | H% | Cl% |
|---|---|---|---|
| calculated | 70.85 | 4.71 | 8.71 |
| found | 71.02 | 4.91 | 8.52 |

By crystallisation in a mixture of methyl isobutyl ketone and hexane, the diastereo isomer melting at 175°C (sealed tube) is obtained:

Gravimetric analysis: $C_{24}H_{19}ClO_4$ - molecular weight = 406.84

|  | C% | H% | Cl% |
|---|---|---|---|
| calculated | 70.85 | 4.71 | 8.71 |
| found | 70.87 | 4.92 | 8.78 |

EXAMPLE 25: 3-(4'-hydroxy-4'-coumarinyl)-3-paranitrophenyl-1-phenyl-propan-1-ol

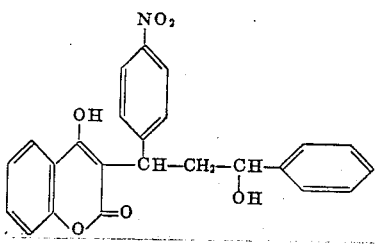

The compound of this example was prepared from the 3-(4'-hydroxy-3'-coumarinyl)-3-paranitrophenyl propiophenone, itself obtained in the following manner:

| paranitrobenzylidene acetophenone | 25.3 g (0.1 mol) |
| 4-hydroxy coumarin | 17.8 g (0.11 mol) |
| piperidine | 0.89 g |
| dioxane | 100 cc |

Heating under reflux takes place for 7 hours. The solvent is evaporated and the residue is crystallised in acetone. Recrystallisation takes place in a mixture of alcohol and dioxane. There are obtained 26.2 g, i.e. 63%, of white crystals melting at 230°C (sealed tube). $C_{24}H_{17}NO_6$.

This compound is then reduced with aluminium isopropylate. By operating on 18.67 g (0.045 mol) of the intermediate compound described above, there are obtained 13 g of the corresponding alcohol (70%), having a melting point of 105°C (sealed tube).

Gravimetric analysis: $C_{24}H_{19}NO_6$ - molecular weight = 417.40

|  | C% | H% | N% |
|---|---|---|---|
| calculated | 69.06 | 4.59 | 3.35 |
| found | 68.97 | 4.70 | 3.38 |

Two recrystallisations in the mixture of methyl isobutyl ketone and hexane supply an isomer melting at 161°–162°C (sealed tube).

Gravimetric analysis: $C_{24}H_{19}NO_6$

|  | C% | H% | N% |
|---|---|---|---|
| calculated | 69.06 | 4.59 | 3.35 |
| found | 68.84 | 4.53 | 3.53 |

EXAMPLE 26: 3-(4'-hydroxy-3'-coumarinyl)-3-parabromophenyl-1-phenyl-propan1-ol

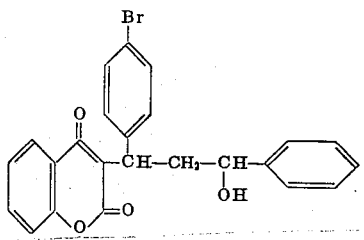

The compound of this example is prepared from 3-(4'-hydroxy-3'-coumarinyl)-3-parabromophenyl propiophenone.

This intermediary is obtained in the following manner: the following are heated for 7 hours under reflux:

14.3 g (0.88 mol) of 4-hydroxy coumarin
23.0 g (0.08 mol) of parabromobenzylidene acetophenone
0.7 g of piperidine
80 ml of dioxane.

The mass is caused to crystallise after evaporation of the dioxane by means of acetone. The substance is suction-filtered and recrystallised from ethanol. There are obtained 22.3 g (62%) of white crystals, melting at 162°C ($C_{24}H_{17}BrO_4$).

This intermediary is reduced with a yield of 73% as in the preceding example. The 3-(4'-hydroxy-3'-coumarinyl)-3-parabromophenyl-1-phenyl-propan-1-ol has a pasty fusion at 95°–100°C (sealed tube).

Gravimetric analysis: $C_{24}H_{19}BrO_4$ - molecular weight = 451.31

|  | C% | H% | Br% |
|---|---|---|---|
| calculated | 63.87 | 4.24 | 17.71 |
| found | 63.76 | 4.36 | 17.59 |

From the foregoing mixture, the diastereo isomer, melting at 154°C (sealed tube), is extracted by crystallisation in a mixture of isobutyl ketone and hexane.

Gravimetric analysis: $C_{24}H_{19}BrO_4$ - molecular weight = 451.34

|  | C% | H% | Br% |
|---|---|---|---|
| calculated | 63.87 | 4.24 | 17.71 |
| found | 63.82 | 4.42 | 17.77 |

EXAMPLE 27: 3-(4'-hydroxy-3'-coumarinyl)-3-phenyl-1-β-naphthyl-propan-1-ol

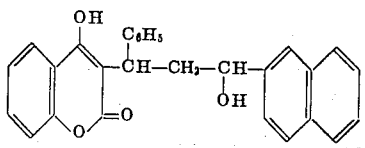

The compound of this example was obtained from the 3-(4'-hydroxy-3'-coumarinyl)-3β-phenyl-1-naphthyl-propan-1-one. This intermediary is obtained by heating the following mixture for 7 hours under reflux:

benzylidene-β-acetonaphthone   25.8 g (0.1 mol)
4-hydroxy coumarin   17.8 g (0.11 mol)
piperidine   0.9 g
dioxane   100 cc There are obtained 26.3 g of white crystals (ethanol) melting at 138°C (sealed tube).
Gravimetric analysis: $C_{28}H_{20}O_4$ - molecular weight = 420.44

|  | C% | H% |
|---|---|---|
| calculated | 79.99 | 4.79 |
| found | 79.82 | 4.95 |

This intermediary, 14.7 g (0.35 mol), is reduced with aluminium isopropylate with a yield of 9.6 g (68%). A white compound is obtained which has a spread melting point at 100°–105°C (sealed tube).
Gravimetric analysis: $C_{28}H_{22}O_4$ - molecular weight = 422.46

|  | C% | H% |
|---|---|---|
| calculated | 79.60 | 5.25 |
| found | 79.50 | 5.09 |

EXAMPLE 28: 3-(4'-hydroxy-3'-coumarinyl3-phenyl-1-(4'-diphenyl)-propan-1-ol

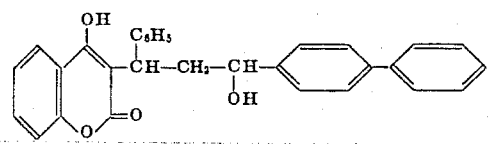

The compound of this example is obtained from 3-(4'-hydroxy-3'-coumarinyl)-3-phenyl-1-(4'-diphenyl)-propan-1-one.
This intermediary is obtained by the following being heated for 8 hours under reflux:

benzylidene paraphenyl acetophenone   23.7 g (0.08 mol)
4-hydroxy coumarin   14.3 g (0.088 mol)
piperidine   0.7 g
dioxane   80 ml There are obtained 18.2 g (52%), melting at 172°C (sealed tube), after two recrystallisations from ethyl acetate.
Percentage analysis: $C_{30}H_{22}O_4$ - molecular weight 446.48

|  | C% | H% |
|---|---|---|
| calculated | 80.70 | 4.97 |
| found | 80.65 | 4.91 |

This intermediary was reduced with a yield of 80%, using a mixture of isopropanol and dioxane (75–25).
After two passages in the sodium salt stage (hot 5% bicarbonate), a white product is obtained which melts at 110°C (sealed tube).
$C_{30}H_{24}O_4$ - molecular weight = 448.49

|  | C% | H% |
|---|---|---|
| calculated | 80.34 | 5.39 |
| found | 80.35 | 5.39 |

An isomer melting at 194°C is isolated in the mixture of methyl isobutyl ketone and hexane.

Gravimetric analysis: $C_{30}H_{24}O_4$ - molecular weight = 448.49

|  | C% | H% |
|---|---|---|
| calculated | 80.34 | 5.39 |
| found | 80.18 | 5.61 |

EXAMPLE 29: 3-(4'-hydroxy-3'-coumarinyl)-3-phenyl-1-(4-chloro-4'-diphenylyl)propan-1-ol.

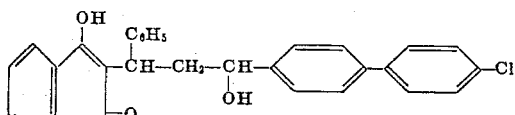

was obtained from the 3-(4'-hydroxy-3'-coumarinyl)-3-phenyl-1-(4-chloro-4'-diphenylyl)propan-1-one, which compound is itself prepared in the following manner:

22.3 g (0.07 mol) of benzylidene para-(4'-chlorophenyl)-acetophenone
12.5 g (0.77 mol) of 4-hydroxy coumarin
0.70 g piperidine
70 ml dioxane are refluxed for 7 hours.
There are obtained 22.5 g (67%) of a compound melting at 182°C (sealed tube), after crystallisation in a mixture of alcohol and dioxane ($C_{30}H_{21}ClO_4$). 16.8 g (0.035 mol) of this compound are reduced with 21.4 g of aluminium isopropylate in 260 ml of isopropanol and 50 ml of dioxane. After refluxing for 1 hour, the solution poured into 1000 ml of cold water containing 100 ml of 21° Be HCl allows the precipitation of a coloured product, which is purified by passage in solution into hot 5% HNaCO₃. After acidification, the white product precipitates. After drying under vacuum, there are obtained 13.2 g (78%) of a compound melting at 105°–108°C (sealed tube).
Gravimetric analysis: $C_{30}H_{23}ClO_4$ - molecular weight = 482.93

|  | C% | H% | Cl% |
|---|---|---|---|
| calculated | 74.60 | 4.80 | 7.35 |
| found | 74.43 | 4.82 | 7.22 |

EXAMPLE 30: 3-(4'-hydroxy-3'-coumarinyl)-3-phenyl-1-(4-bromo-4'-diphenylyl)propan-1-ol

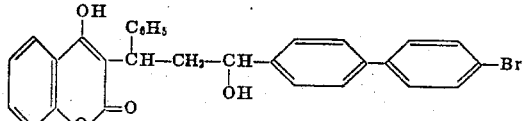

a. 3-(4'-hydroxy-3'-coumarinyl)-3-phenyl-1-(4-bromo-4'-diphenylyl)propan-1-one.
The following are heated for 7 hours under reflux:
18.2 g (0.05 mol) of benzylidene para-(4'-bromophenyl)acetophenone
8.9 g (0.055 mol) of 4-hydroxy coumarin
0.45 g of piperidine
50 ml of dioxane.

The solvent is evaporated under vacuum and the residue is recrystallized from a mixture of alcohol and dioxane. There are obtained 16.2 g (62%) of a white compound melting at 190°C (sealed tube). $C_{30}H_{21}BrO_4$.
b. 13.1 g (0.025 mol) of this compound are reduced with 15.3 g (0.075 mol) of aluminium isopropylate in 200 ml of isopropanol and 60 ml of dioxane. The solution obtained is poured after refluxing for 1 hour into acidulated water. The precipitate which forms is dissolved in HNaCO₃ and acidified. After drying, this product is analytically pure. There are obtained 9.2 g (70%) of white compound melting at 112°-115°C (sealed tube).

Gravimetric analysis: $C_{30}H_{23}BrO_4$ - molecular weight = 527.40

|  | C% | H% | Br% |
|---|---|---|---|
| calculated | 68.32 | 4.39 | 15.15 |
| found | 68.12 | 4.58 | 15.29 |

PHARMACOLOGICAL RESULTS

The rat-destroying activity was investigated in connection with the adult white rat. The tests were carried out on batches of ten animals. They receive for one day wheat containing the compound to be investigated, after having received for several days a feed consisting of ordinary wheat. The poisoned food was replaced from the second day by ordinary wheat.

When, in the general formula:

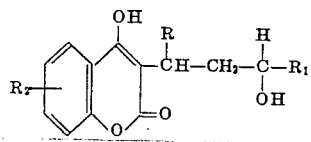

$R_2 = H$ ; $R = C_6H_5$ ; $R_1 = -C_6H_4 - C_6H_4 - Cl$ (L.M. 636)

$R_2 = H$ ; $R = C_6H_5$ ; $R_1 = -C_6H_4 - C_6H_4 - Br$ (L.M. 637)

the results are as follows:

| Compounds | Concentration | Mortality |
|---|---|---|
| 3-ethyl-(1'-phenyl-2'-acetyl)-4 hydroxycoumarin | 0.0025% | 1/10 |
| L.M. 636 | 0.0025% | 9/10 |
| L.M. 630 | | |

The poisoned baits were prepared in the following manner:

In a first period, the wheat was impregnated with an alcoholic solution of the toxic substance:
wheat 1 Kg
toxic compound 25 mg
ethanol 50 cc.

The solvent is evaporated and the wheat is colored with a dye solution:
organol red dye 100 mg
valine oil 20 cc While the most active compounds also have a good action in killing mice, it was seen that the compound for which, in the general formula: $R_2 = H$ ; $R = H$ and $R_1 = -C_6H_4 - C_6H_4 - Br$ (L.M. 568) has a much higher effect in killing mice than in killing rats.

The mouse-killing test of this product was carried out on male N.M.R.I mice weighing 25 g. The bait with 0.005% of mol. weight 568 was given for two days after one week of normal wheat, the food starting from the third day being once again normal wheat.

The mortality observed was 22/30 mice between the fourth and eighth days.

In the same concentration, the L.M. 568 (product given for one day under the conditions previously described for the rat-killing test) only produced two deaths out of ten.

What is claimed is:

1. A rodenticidal composition comprising a rodenticidally effective amount of an active compound of the formula:

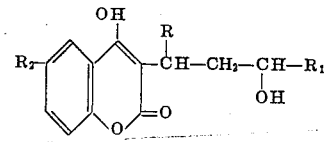

wherein R is hydrogen, phenyl, halophenyl, dihalophenyl, nitrophenyl, methoxyphenyl, tolyl, methylene dioxphenyl or furyl, R₁ is methyl, phenyl, halophenyl, nitrophenyl, diphenyl, halodiphenyl, nitrodiphenyl or naphthyl, and R₂ is hydrogen or a halogen; and a rodent feed as bait.

2. The rodenticidal composition of claim 1 wherein said feed is wheat.

3. The rodenticidal composition of claim 1 wherein said active ingredient is selected from the group consisting of 3-(4'-hydroxy-3'-coumarinyl)-3-phenyl-1-(4-chloro-4'-diphenylyl) propan-1-ol and 3-(4'-hydroxy-3'-coumarinyl)-3-phenyl-1-(4-bromo-4'-diphenylyl) propan-1-ol.

4. The rodenticidal composition of claim 1 wherein said active ingredient is 3-(4'-hydroxy-3'-coumarinyl)-1-(4'-bromopara-diphenylyl)-propan-1-ol.

5. The rodenticidal composition of claim 1 wherein R₂ is hydrogen.

6. The rodenticidal composition of claim 1 wherein R₂ is hydrogen, R₁ is halodiphenyl and R is hydrogen or phenyl.

7. The rodenticidal composition of claim 6 wherein said active compound is present in a concentration between 0.0025 percent and 0.005 percent.

8. The rodenticidal composition of claim 3 wherein said active compound is present in a concentration of about 0.0025 percent.

9. The rodenticidal composition of claim 4 wherein said active compound is present in a concentration of about 0.005 percent.

10. The method of killing rodents comprising applying to the rodent inhabiting locus a rodenticidally effective amount of the composition of claim 1.

* * * * *

UNITED STATES PATENT OFFICE
CERTIFICATE OF CORRECTION

Patent No. 3,764,693　　　　　　　　Dated October 2, 1973

Inventor(s) Boschetti et al.

It is certified that error appears in the above-identified patent and that said Letters Patent are hereby corrected as shown below:

Column 7, line 36, delete "-bromo-";

same line, delete "3.85" and insert therefor -- 3.86--.

Column 17, line 38, delete "9/10" and under

"Mortality" delete "L.M. etc" and insert therefor -- 9/10-- between lines 38 and 39, insert --

L.M. 637　　　　　0.0025%　　　　　10/10--.

Signed and sealed this 14th day of May 1974.

(SEAL)
Attest:

EDWARD M. FLETCHER, JR.　　　　　　C. MARSHALL DANN
Attesting Officer　　　　　　　　　Commissioner of Patents